US011102638B2

(12) United States Patent
Hamilton et al.

(10) Patent No.: US 11,102,638 B2
(45) Date of Patent: *Aug. 24, 2021

(54) POWER MANAGEMENT TECHNIQUES FOR INCREASING BATTERY LIFE IN AN ALERT GENERATION SYSTEM

(71) Applicant: InvisaWear Technologies LLC, Lowell, MA (US)

(72) Inventors: Raymond Hamilton, Lowell, MA (US); Rajia Abdelaziz, Lowell, MA (US)

(73) Assignee: Invisawear Technologies LLC, Lowell, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/807,092

(22) Filed: Mar. 2, 2020

(65) Prior Publication Data
US 2020/0204973 A1 Jun. 25, 2020

Related U.S. Application Data

(63) Continuation of application No. 16/417,275, filed on May 20, 2019, now Pat. No. 10,582,365, which is a (Continued)

(51) Int. Cl.
H04W 4/90 (2018.01)
H04W 52/02 (2009.01)
(Continued)

(52) U.S. Cl.
CPC ............ H04W 4/90 (2018.02); H04W 4/023 (2013.01); H04W 4/025 (2013.01); H04W 4/80 (2018.02);
(Continued)

(58) Field of Classification Search
CPC ................................. H04W 4/80; H04W 4/023
(Continued)

(56) References Cited

U.S. PATENT DOCUMENTS

2005/0151642 A1 7/2005 Tupler et al.
2013/0080250 A1 3/2013 Lee
(Continued)

OTHER PUBLICATIONS

Non-Final Office Action on U.S. Appl. No. 16/032,884 dated Jan. 18, 2019.
(Continued)

Primary Examiner — Kiet M Doan
(74) Attorney, Agent, or Firm — Foley and Lardner LLP

(57) ABSTRACT

This disclosure provides systems and methods for providing an emergency alert notification. An electronic communication device can receive, from an alert generation device, a low power advertising packet responsive to an action performed on the alert generation device. Before the action is performed, the alert generation device can be in a low power state, such as a sleep state, to conserve battery. The action can cause the alert generation device to transition from the low power state to a second state in which the alert generation device begins transmitting the advertising packet. The electronic communication device can identify at least one emergency contact to receive an alert based on a contact policy and can determine an alert type based on the contact policy. The electronic communication device can generate the alert including a request for assistance and can transmit the alert to the at least one emergency contact.

18 Claims, 9 Drawing Sheets

Related U.S. Application Data continuation of application No. 16/032,884, filed on Jul. 11, 2018, now Pat. No. 10,299,103.

(60) Provisional application No. 62/532,254, filed on Jul. 13, 2017.

(51) Int. Cl.
*H04W 88/06* (2009.01)
*H04W 4/80* (2018.01)
*H04W 4/02* (2018.01)

(52) U.S. Cl.
CPC ....... *H04W 52/0209* (2013.01); *H04W 88/06* (2013.01)

(58) Field of Classification Search
USPC .................................................... 340/539.13
See application file for complete search history.

(56) References Cited

U.S. PATENT DOCUMENTS

| | | |
|---|---|---|
| 2013/0210478 A1 | 8/2013 | Sakata et al. |
| 2015/0154844 A1* | 6/2015 | Skaaksrud ......... G06Q 30/0267 340/539.13 |
| 2015/0230072 A1 | 8/2015 | Saigh et al. |
| 2015/0243150 A1 | 8/2015 | Kang et al. |
| 2016/0174266 A1 | 6/2016 | Goel et al. |
| 2018/0146354 A1 | 5/2018 | Patel |

OTHER PUBLICATIONS

Non-Final Office Action on U.S. Appl. No. 16/417,275 dated Sep. 3, 2019.
Notice of Allowance on U.S. Appl. No. 16/032,884 dated Apr. 1, 2019.
Notice of Allowance on U.S. Appl. No. 16/417,275 dated Nov. 25, 2019.

* cited by examiner

275

Estimated Street Location: 94 Parnell Place, Nashua NH 03060
Lat: 25.7621666989255   Long: -80.1935190610721   — 280

— 282

Photograph

Phone Number
Date of Birth
Height & Weight
Ethnicity
} 284

Additional Info

*Allergies:* Bees
*Medical Conditions:* N/A
*Disabilities:* Deaf
*Medications:* 200 Mg of Advil
*Additional Notes:* Restraining order on John Smith
} 286

POWER MANAGEMENT TECHNIQUES FOR INCREASING BATTERY LIFE IN AN ALERT GENERATION SYSTEM

CROSS-REFERENCE TO RELATED APPLICATIONS

This application is a continuation of U.S. patent application Ser. No. 16/417,275, filed on May 20, 2019 and entitled "POWER MANAGEMENT TECHNIQUES FOR INCREASING BATTERY LIFE IN AN ALERT GENERATION SYSTEM," which is a continuation of U.S. patent application Ser. No. 16/032,884, filed on Jul. 11, 2018 and entitled "POWER MANAGEMENT TECHNIQUES FOR INCREASING BATTERY LIFE IN AN ALERT GENERATION SYSTEM," which claims priority to U.S. Provisional Patent Application No. 62/532,254, filed on Jul. 13, 2017 and entitled "ALERT NOTIFICATION SYSTEM WITH ADAPTIVE NOTIFICATION POLICIES," each of which is incorporated herein by reference in its entirety.

FIELD OF THE DISCLOSURE

This disclosure generally relates to alert notification systems and methods. In particular the disclosure relates to efficiently managing power consumption of alert notification systems including short-range communication devices for transmitting alerts via a cellular or wireless communications network.

BACKGROUND OF THE DISCLOSURE

Various situations and events may require notifications to be sent from a computing device of an individual to one or more contacts of the individual. However, in some instances, the individual may not have easy access to the computing device to generate the notification and to select the contacts to whom the notification is to be sent.

BRIEF SUMMARY OF THE DISCLOSURE

An alert notification system with adaptive notification policies, as well as power management techniques for the system, are provided. The system can include a computing device in communication with a portable device. The portable device can be a device carried, worn, or closely held by a user. The computing device can be, for example, a mobile phone, a tablet computing device, a laptop computer, or a desktop computer. In situations in which the user is unable to readily access the computing device, the user can cause a notification to be sent from the computing device by interacting instead with the portable device, which may be more easily accessible to the user. The portable device may include a simple user interface including, for example, a single button that the user can press to indicate that an alert notification should be sent to one or more of the user's contacts. The portable device can wirelessly transmit, to the computing device, a signal or indication that causes the computing device to send an electronic notification to one or more computing devices associated with one or more contacts. The computing device, responsive to receiving the signal, can cause the computing device to identify, via the signal, an application executable on the computing device. The application executing on the computing device can access a contact list and select the one or more contacts based on a predetermined set of parameters and cause the computing device to transmit an alert notification to computing devices of the selected contacts without the user having to interact directly with the computing device.

The methods, systems and apparatus provided in this disclosure can be useful in various applications. For example, in some implementations, the methods, systems, and apparatus of this disclosure can allow a user to quickly and reliably call or request for help in an emergency situation. During an emergency situation, the user may need to contact help as quickly as possible. Emergency situations may include any situations that put the health or safety of a person at risk. Quickly and reliably notifying police, firefighters, friends, family members, nearby good Samaritans, or other emergency contacts can significantly increase the likelihood that a person will be able to safely cope with the emergency situation. However, it can be difficult for a person to call or request for help in an emergency situation, because means of communication, such as a cellular phone, may be inaccessible to the person in such a situation.

In some implementations, a user may have a portable electronic device with a simple user interface. The portable device may be worn on the users body (for example, as an integrated component of a piece of jewelry or other accessory), carried in the user's pocket, or otherwise stored by the user such that the user has easy and fast access to the portable device. The portable device also can include a simple user interface through which the individual can interact with the portable device. For example, in some implementations the user interface of the portable device may consist of only a single button. Thus, in emergency situations during which the user may not have sufficient time to send an alert (such as an email, a text message, or a voice call) to an emergency contact using a traditional computing device, the user may instead interact with the portable device. Interaction with the portable device can be significantly faster and easier due to its simple user interface. For example, pressing the single button on the portable device may take no more than a few seconds for the user to accomplish. The portable device can then communicate with a computing device, such as a mobile phone, a tablet computing device, a laptop computing device, or a desktop computing device to cause the computing device to send an alert notification to one or more contacts of the user without the user interacting directly with the computing device.

In some implementations, the computing device can execute a software application to assist with the functionality described above. For example, the application can receive the indication that the user has pressed the button on the portable device. In response, the application can select one or more emergency contacts of the user who should be notified that the user may be experiencing an emergency requiring immediate assistance. In some implementations, the application can select the one or more emergency contacts based on a set of policies that may take into account information such as time of day and current location to determine an appropriate group of one or more emergency contacts to be notified. The computing device can then transmit an alert notification to each of the selected emergency contacts, for example via email, text message, or voice call. The alert notifications can notify the selected emergency contacts that the user may be in distress and can also provide information indicating the user's location, thereby allowing the emergency contacts to come to the user to provide assistance.

One aspect of this disclosure is directed to a system for providing an emergency alert notification. The system can include an alert generation device and an electronic communication device. The electronic communication device can be configured to receive, from the alert generation device, a low power advertising packet responsive to an action performed on the alert generation device causing the alert generation device to switch from a first state to a second state. Responsive to receiving the advertising packet from the alert generation device, the electronic communication device can be configured to determine a current location of the electronic communication device. The electronic communication device can be configured to identify at least one emergency contact to receive an alert based on a contact policy. The contact policy can be stored in a memory element of the electronic communication device or otherwise accessed by the electronic communication device. The electronic communication device can be configured to determine an alert type based on the contact policy. The electronic communication device can be configured to generate the alert including a request for assistance. The alert can correspond to the determined alert type. The electronic communication device can be configured to transmit the alert to the at least one emergency contact.

In some implementations, the contact policy can include calendar information stored in a memory element of the electronic communication device or otherwise accessible by the electronic communication device. In some implementations, the electronic communication device can be configured to identify the at least one emergency contact by determining, based on the calendar information stored in the memory element of the electronic communication device, that a user of the electronic device is scheduled to be at a work-related event when the low energy advertising packet is received. The electronic communication device can also identify the at least one emergency contact from among a plurality of coworkers of the user.

In some implementations, the electronic communication device can identifies the at least one emergency contact by determining a respective current location of each of a plurality of contacts and identifying the at least one emergency contact from among the plurality of contacts based on a proximity of the current location of each of the plurality of contacts to the current location of the electronic communication device. In some implementations, the electronic communication device can receive a response to the alert from a computing device associated with the at least one emergency contact. The response can indicate that the at least one emergency contact received the alert.

In some implementations, the electronic communication device can be further configured to determine that the at least one emergency contact has not provided a response to the alert within a predetermined time period. The electronic communication device can be further configured to identify, responsive to the determination that the at least one emergency contact has not provided the response to the alert within the predetermined time period, at least a second emergency contact to receive a second alert based on the contact policy. The electronic communication device can be further configured to determine an alert type of the second alert based on the contact policy. The electronic communication device can be further configured to generate the second alert including a request for assistance. The second alert can correspond to the alert type determined for the second alert. The electronic communication device can be further configured to transmit the second alert to the second emergency contact.

In some implementations, the electronic communication device can be further configured to generate, responsive to receiving the low energy advertising packet, an audible alarm. In some implementations, the electronic communication device can be further configured to generate a visual indication that the alert was transmitted to the at least one emergency contact. In some implementations, the electronic communication device can transmit the alert to the at least one emergency contact by updating a status of a social media account of a user of the electronic communication device to indicate that the user of the electronic communication device may require emergency assistance. In some implementations, the electronic communication device can be further configured to generate the alert to include an indication of the location of the electronic device.

In some implementations, the electronic communication device can be further configured to track, for a predetermined time period, the location of the electronic communication device. The electronic communication device can also be configured to update, during the predetermined period of time, a website to include an indication of the location of the electronic device during the predetermined time period. The alert can include a uniform resource locator (URL) of the website.

Another aspect of this disclosure is directed to a method for providing an emergency alert notification. The method can include receiving, by an electronic communication device from an alert generation device, a low power advertising packet responsive to an action performed on the alert generation device causing the alert generation device to switch from a first state to a second state. Responsive to receiving the advertising packet from the alert generation device, the method can include determining, by the electronic communication device, a current location of the electronic communication device. The method can include identifying, by the electronic communication device, at least one emergency contact to receive an alert based on a contact policy. The contact policy can be stored in a memory element of the electronic communication device. The method can include determining, by the electronic communication device, an alert type based on the contact policy. The method can include generating, by the electronic communication device, the alert including a request for assistance. The alert can correspond to the determined alert type. The method can include transmitting, by the electronic communication device, the alert to the at least one emergency contact.

In some implementations, the contact policy can include calendar information stored in a memory element of the electronic communication device. In some implementations, identifying the at least one emergency contact can include determining, by the electronic communication device based on the calendar information stored in the memory element of the electronic communication device, that a user of the electronic device is scheduled to be at a work-related event when the low energy advertising packet is received. The method can also include identifying the at least one emergency contact from among a plurality of coworkers of the user.

In some implementations, identifying the at least one emergency contact can include determining, by the electronic communication device, a respective current location of each of a plurality of contacts, and identifying the at least one emergency contact from among the plurality of contacts based on a proximity of the current location of each of the plurality of contacts to the current location of the electronic communication device. In some implementations, the method can include receiving, by the electronic communication device, a response to the alert from a computing device associated with the at least one emergency contact. The response can indicate that the at least one emergency contact received the alert.

In some implementations, the method can include determining, by the electronic communication device, that the at least one emergency contact has not provided a response to the alert within a predetermined time period. The method can also include identifying, by the electronic communication device responsive to the determination that the at least one emergency contact has not provided the response to the alert within the predetermined time period, at least a second emergency contact to receive a second alert based on the contact policy. The method can also include determining, by the electronic communication device, an alert type of the second alert based on the contact policy. The method can also include generating, by the electronic communication device, the second alert including a request for assistance. The second alert can correspond to the alert type of the second alert. The method can also include transmitting, by the electronic communication device, the second alert to the second emergency contact.

In some implementations, the method can include generating, by the electronic communication device responsive to receiving the low energy advertising packet, an audible alarm. In some implementations, the method can include generating, by the electronic communication device, a visual indication that the alert was transmitted to the at least one emergency contact. In some implementations, transmitting the alert to the at least one emergency contact can include updating a status of a social media account of a user of the electronic communication device to indicate that the user of the electronic communication device may require emergency assistance. In some implementations, the method can include generating, by the electronic communication device, the alert to include an indication of the location of the electronic device.

In some implementations, the method can include tracking, by the electronic communication device for a predetermined time period, the location of the electronic communication device. The method can also include updating, by the electronic communication device during the predetermined period of time, a website to include an indication of the location of the electronic device during the predetermined time period, wherein the alert comprises a uniform resource locator (URL) of the website.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes power management techniques for increasing battery life in an alert generation system.

A. Computing and Network Environment

Figure 1A:
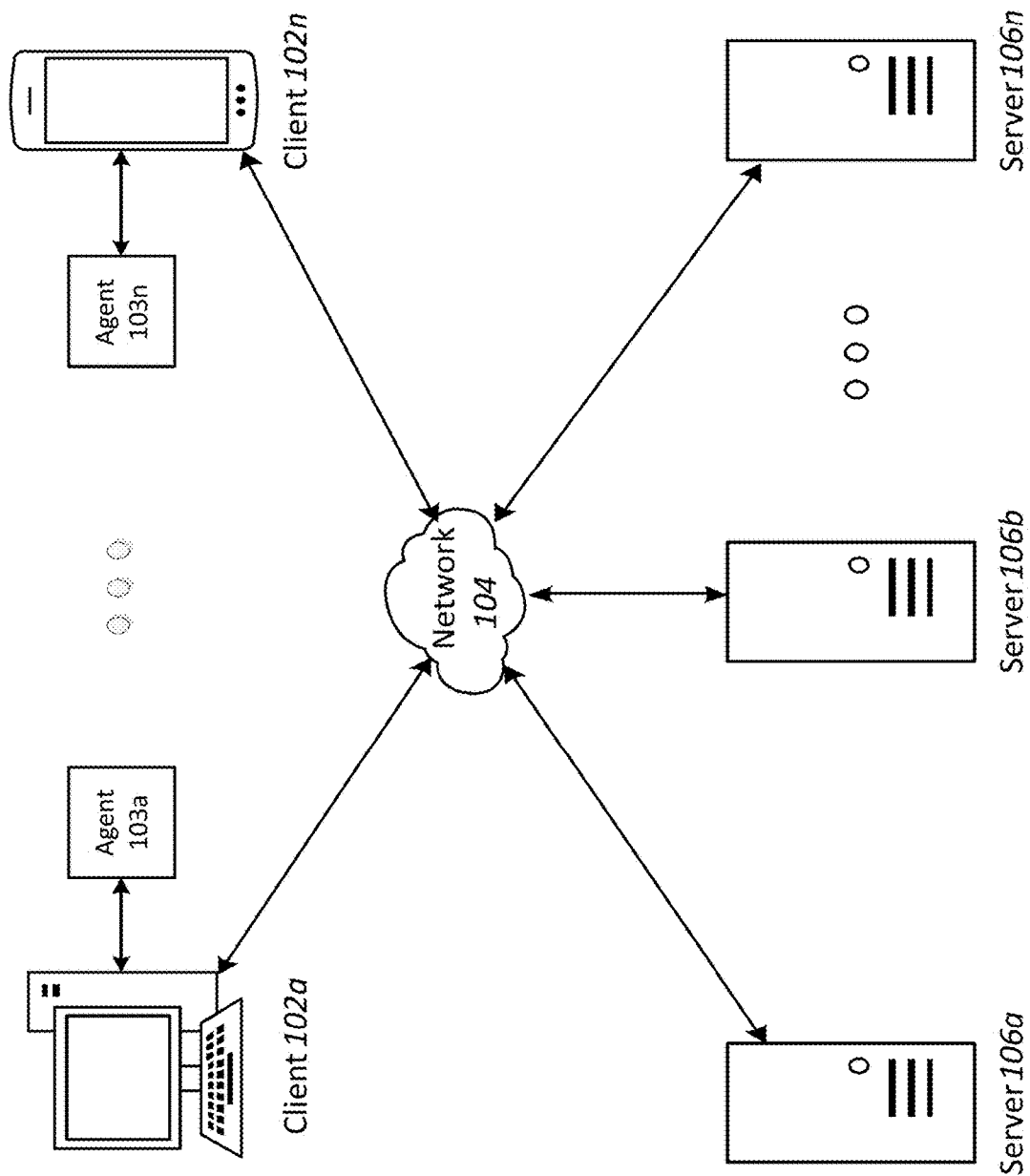
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
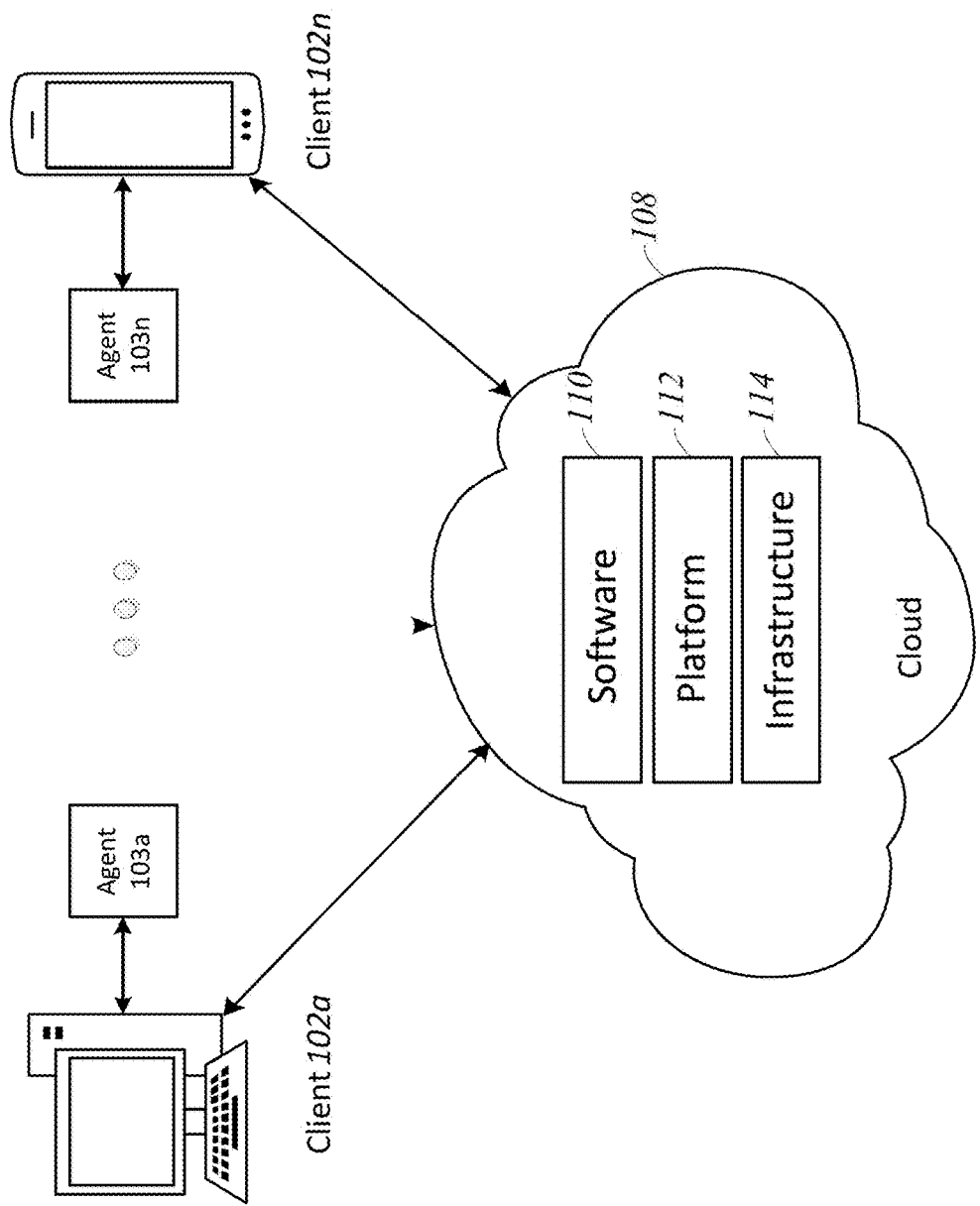
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
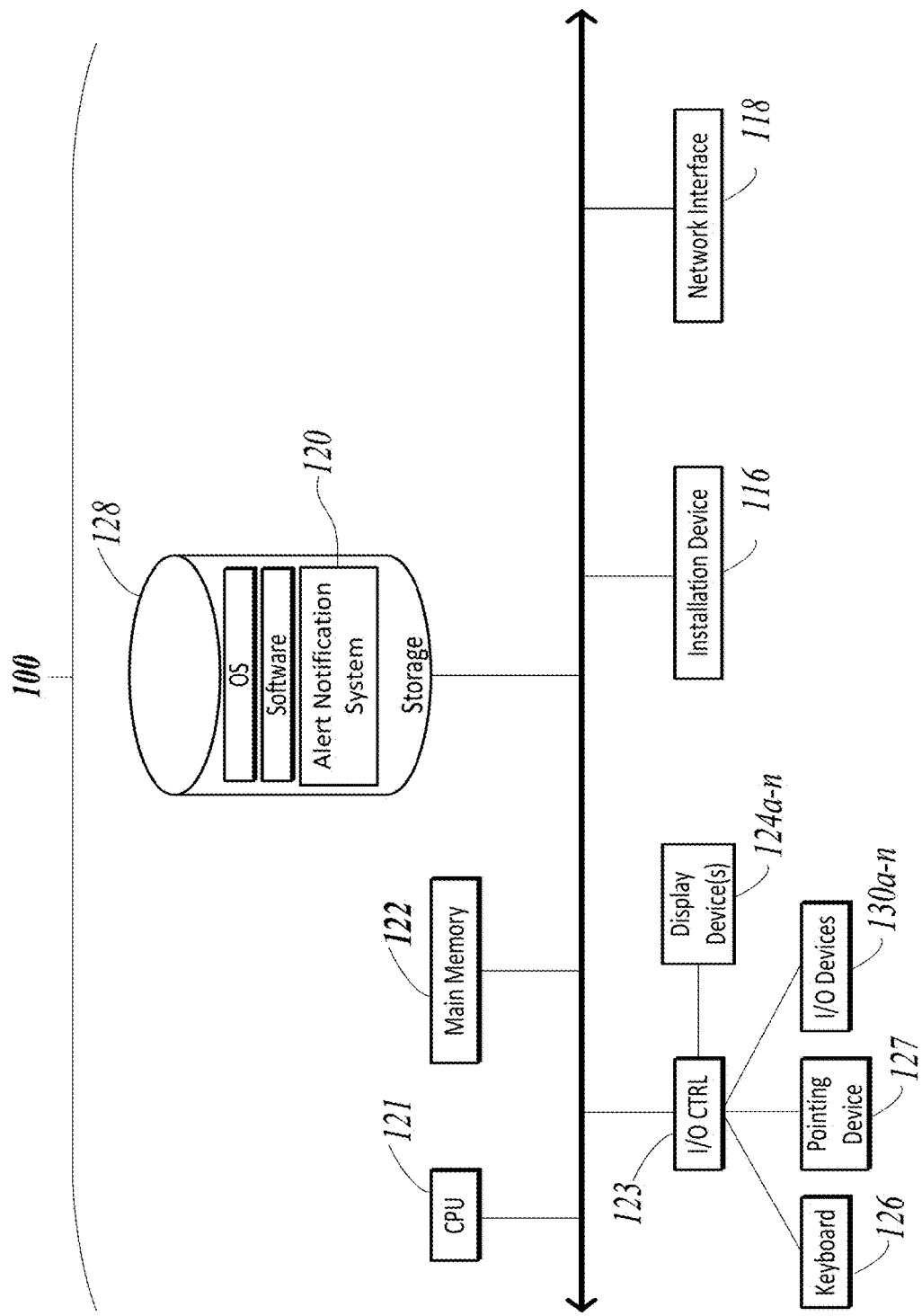
FIGS. 1C and 1D are block diagrams depicting embodiments of computing devices useful in connection with the methods and systems described herein.
Figure 1D:
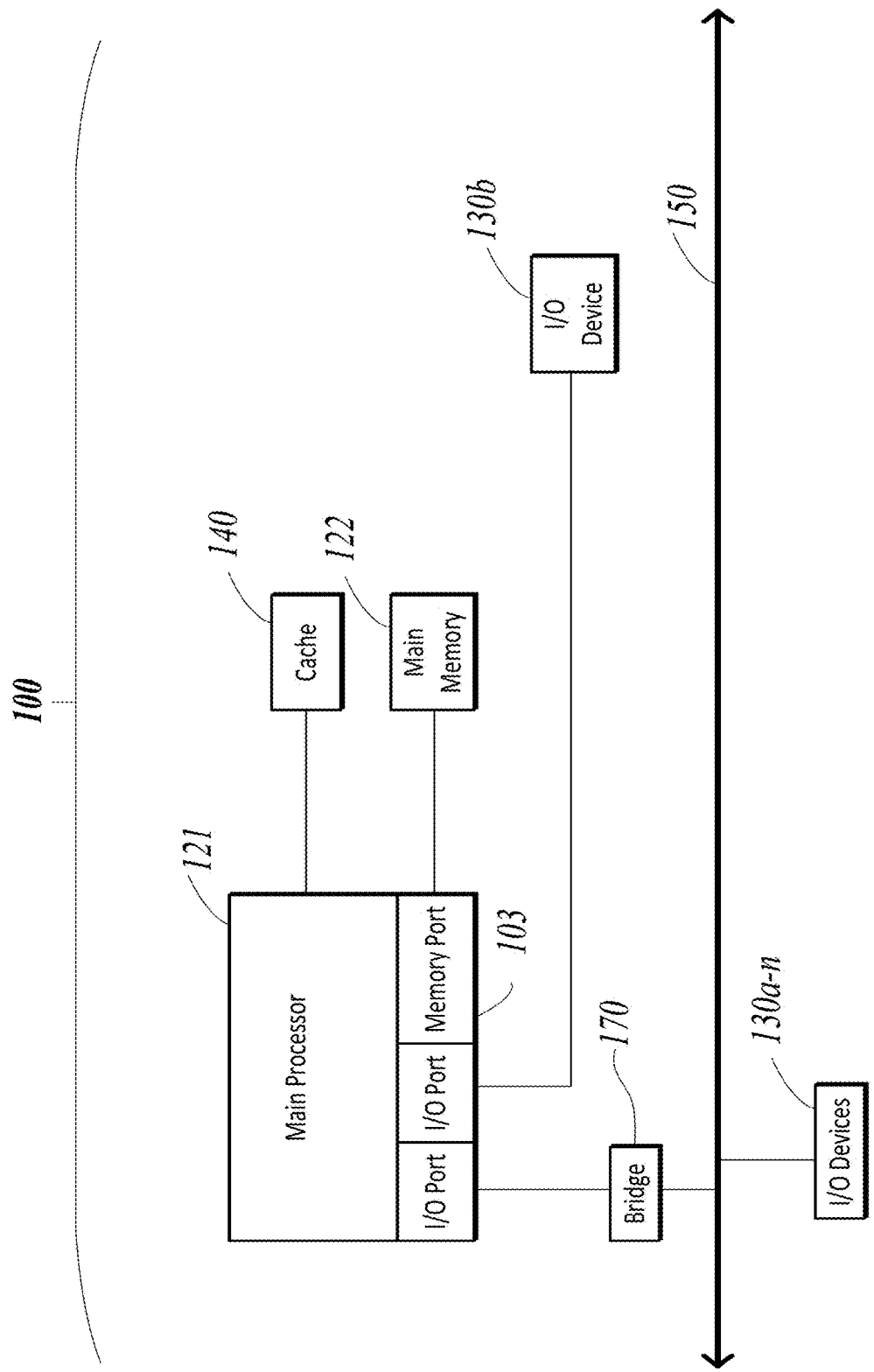

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of an alert notification system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RANI (nvSRAM), Ferroelectric RANI (FeRAM), Magnetoresistive RANI (MRAM), Phase-change memory (PRAM), conductive-bridging RANI (CBRAM), Silicon-Oxide-Nitride-Oxide-Silicon (SONOS), Resistive RAM (RRANI), Racetrack, Nano-RANI (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provides for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the alert notification system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOK S.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store.

In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Power Management Techniques for Increasing Battery Life in an Alert Generation System An alert notification system with adaptive notification policies, as well as power management techniques for such a system, are provided. The system can include a computing device, such as an electronic communication device, in communication with a portable device, such as a portable alert generation device. The portable device can be a device carried, worn, or otherwise closely held by a user. The computing device can be, for example, a mobile phone, a tablet computing device, a laptop computer, or a desktop computer. In situations in which the user is unable to readily access the computing device, the user can cause a notification to be sent from the computing device by interacting instead with the portable device, which may be more easily accessible to the user. The portable device may include a simple user interface including, for example, a single button that the user can press to indicate that an alert notification should be sent to one or more of the user's contacts. The portable device can wirelessly transmit to the computing device an indication that the user wishes to send a notification to one or more contacts. The computing device can then select the one or more contacts based on a predetermined set of parameters and transmit an alert notification to the selected contacts without the user having to interact directly with the computing device.

The methods, systems and apparatus provided in this disclosure can be useful in various applications. For example, in some implementations, the methods, systems, and apparatus of this disclosure can allow a user to quickly, discreetly and reliably call or request for help in an emergency situation. During an emergency situation, the user may need to contact help as quickly as possible. Emergency situations may include any situations that put the health or safety of a person at risk. Quickly and reliably notifying police, firefighters, friends, family members, nearby good Samaritans, or other emergency contacts can significantly increase the likelihood that a person will be able to safely cope with the emergency situation. However, it can be difficult for a person to call or request for help in an emergency situation, because means of communication, such as a cellular phone, may be inaccessible to the person in such a situation. Many times people don't have enough time to reach their phone before it's too late. There is no easily accessible, discreet, and reliable way to call for help in an emergency.

The systems and methods described herein provide smart jewelry and accessories that allow users to instantly contact friends, family and police in the event of an emergency. The systems can include a portable device designed to fit into a custom array of bracelets, watches, necklaces, key chains, anything stylish people actually want to wear. Users can simply press a button in an emergency to notify a group of their contacts with their GPS location and connect them to the nearest 911 operator.

In some implementations, no charging of the portable device may be necessary. Thus, a user does not have to worry about charging yet another device. The battery for the portable device can last for one year or more, and a user can have the option to repurchase a new product (i.e., a new portable device) at a discount. For example, the battery may be permanently installed in the portable device so that the user does not have to be concerned with recharging or replacing the battery. The portable device itself can be configured to operate in a manner that promotes long battery life. For example, while situations in which a user requires emergency assistance are very serious, their frequency of occurrence for a typical user may be relatively rare. However, emergency situations often arise unexpectedly without advance notice to the user. As a result, the user should always be prepared to deal with an emergency situation, even if such a situation occurs only rarely for the user.

The portable device can be configured to operate in a power-efficient manner under the assumption that emergency situations are both rare and unexpected. For example, the relative rarity and unexpected nature of emergency situations means that the portable device will likely not need to be activated for most of its life, but that it should be easily accessible to a user at any time. This disclosure provides techniques for configuring an operating the portable device to take advantage of this. In some implementations, the portable device can normally operate in a first state that is relatively power efficient. For example, the portable device can operate in a low power mode, such as a sleep mode, during normal situations in which emergency assistance is not needed.

The portable device can also be configured such that it is simple and fast for a user to cause the portable device to transition out of the first state into a second state that may require more power during an emergency situation. For example, as described above, the portable device may have a simple user interface (e.g., a single button) that the user may use to quickly put the portable device into the second state, in which the portable device can work together with the computing device to provide an alert notification to one or more emergency contacts. Because power is conserved during normal (e.g., non-emergency) situations as described above, the portable device is more likely to have sufficient battery level to perform any of the more power-intensive functionality that may be used to notify the emergency contact, as described further below.

In some implementations, the simplified nature of the portable device itself can also be used to conserve battery. For example, the portable device may be configured to provide only a limited feature set, such as indicating that the user requires emergency assistance. Thus, activation of the portable device by the user (e.g., via an interaction with the simple user interface of the portable device, as described above) can be sufficient on its own to indicate that the user needs assistance. As a result, the information required to be transmitted from the portable device to the computing device can be quite limited. In some implementations, because the portable device normally operates in a low power mode in which it may not transmit any information, the computing device may recognize that any transmission of information from the portable device, regardless of the data content of such a transmission, indicates that the user has activated the portable device. Thus, the portable device may transmit simple packets, such as advertising packets that contain no data payload (or only a relatively small data payload) to the computing device, and the computing device can still recognize that the user has activated the portable device to request emergency assistance. In some implementations, it can be useful to perform computationally intensive tasks such as determining one or more potential emergency contacts, generating one or more alerts, and transmitting the alerts to the emergency contacts. This disclosure provides techniques for offloading these computationally intensive features, which typically require substantial batter power, to the computing device, rather than performing them on the portable device itself. The computing device may be a cell phone, a laptop computer, or another type of device typically having more processing power than the portable device, as well as a rechargeable battery, and may therefore be better suited to performing such tasks as compared to the portable device. In some implementations, the computing device can execute an application configured to facilitate performance of this functionality, as well as to provide a degree of customization to the user. Thus, by configuring the portable device and the computing device in complementary ways, as described further below, battery power of the portable device can be intelligently conserved, which can extend the life of the portable device and can help to ensure that the portable device will function as intended when an emergency situation arises.

The subject matter of this disclosure has the power to enhance the lives of many people. For example, college students, young children, grade school students, runners, elderly individuals, and professionals who work late night shifts or all alone may benefit from the systems and methods described herein. Current personal security systems are ineffective because they are large in size, unappealing in aesthetics, or inconvenient to use. The systems described in this disclosure offer a solution that can be easily accessible, stylish, inexpensive, non-rechargeable and interchangeable. Additionally, current solutions may be offered as a single accessory. In contrast, this disclosure describes an interchangeable component which offers the user flexibility to switch between various forms. For example, the component can be placed inside a watch while going for a run in the morning and later the same night in a necklace at a black tie event.

A user can purchase or otherwise possess a component and an accompanying accessory, such as a necklace, bracelet, or watch. The user can then download an application onto a computing device such as a smart phone. Via the application, the user sets up a personal profile, selects emergency contacts, and enables extra features such as the ability to play a loud alarm. In an emergency, the user can simply double press the component to send designated contacts an alert message containing the user's location.

Once the application is installed on the user's computing device and the component is paired with it, the application will run in the background of the user's computing device listening for an alert to be sent from the component. If the component is double pressed, an alert is sent to the application on the computing device using Bluetooth Low Energy (BLE) communications. The application will in turn cause the computing device to send an alert, such as a text message containing a request for help along with location information to one or more emergency contacts. Additionally there can be a feature to guarantee instant access to emergency responders. This feature can implement a software service called RAPIDSOS that connects the primary emergency contacts to the user's nearest 911 operator who receives the user's location. The user's emergency contacts are then connected to the 911 operator via phone call to provide additional information.

In some implementations, the component may be a portable electronic device with a simple user interface. The portable device may be worn on the user's body (for example, as an integrated component of a piece of jewelry or other accessory), carried in the user's pocket, or otherwise stored by the user such that the user has easy and fast access to the portable device. The portable device also can include a simple user interface through which the individual can interact with the portable device. For example, in some implementations the user interface of the portable device may consist of only a single button. Thus, in emergency situations during which the user may not have sufficient time to send an alert (such as an email, a text message, or a voice call) to an emergency contact using a traditional computing device, the user may instead interact with the portable device. Interaction with the portable device can be significantly faster and easier due to its simple user interface. For example, pressing the single button on the portable device may take no more than a few seconds for the user to accomplish. The portable device can then communicate with a computing device, such as a mobile phone, a tablet computing device, a laptop computing device, or a desktop computing device to cause the computing device to send an alert notification to one or more contacts of the user without the user interacting directly with the computing device.

Various features and functionality of the systems and methods described in this disclosure are introduced briefly below. These features and functionality are described more fully with respect to FIGS. 2A-2C, 3, and 4.

In some implementations, the computing device can execute a software application to assist with the functionality described above. For example, the application can receive the indication that the user has pressed the button on the portable device. In response, the application can select one or more emergency contacts of the user who should be notified that the user may be experiencing an emergency requiring immediate assistance. In some implementations, the application can select the one or more emergency contacts based on a set of policies that may take into account information such as time of day and current location to determine an appropriate group of one or more emergency contacts to be notified. The computing device can then transmit an alert notification to each of the selected emergency contacts, for example via email, text message, or voice call. The alert notifications can notify the selected emergency contacts that the user may be in distress and can also provide information indicating the user's location, thereby allowing the emergency contacts to come to the user to provide assistance.

In some implementations, the systems and methods of this disclosure can provide various other functionality as well. For example, the portable electronic device can integrate with various fashion accessories. Accessories that interface with portable device can designed to be stylish, so that users no longer need to sacrifice safety for fashion and vice versa. Accessories can also be discreet with a modular portable device incorporated into the accessory, so that the accessory will not tip off an attacker that the user has used the accessory and associated portable component to call for help. Accessories also can be interchangeable. The portable device can fit within a wide variety of jewelry pieces and other accessories, allowing users to vary the jewelry they'd like to wear every day.

In some implementations, the system can provide an alarm feature allowing a user to play a loud noise to attract help and deter attackers. An auto contact 911 feature can allow the device to send an SMS message to police if no emergency contacts respond.

In some implementations, no charging of the portable device is necessary. Users don't have to worry about charging yet another device. The battery can last for one year or more, and users can have the option to repurchase a new product at a discount. The portable device also can be interchanged within jewelry and other accessories. The portable device can easily fit into to the back of the custom designed charm to allow users to quickly and easily change which piece of jewelry, watch or accessory they'd like to wear.

In some implementations, the system can provide location-based alerts. A user can configure an application executing on the computing device to automatically determine which emergency contacts are notified based on their current location. For example, when the user is at work, coworkers can be notified, and when the user is at home, family & friends can be notified.

In some implementations, the system can be designed to provide a custom audible alert. For example, a user can record a customized voice message to be played during an emergency alert to deter an attacker.

In some implementations, the system can provide consistent tracking. For example, the system can continuously or periodically monitor its location via information received, for example, from a global positioning system, cellular tower triangulation, or sensors on the device, such as an accelerometer or barometer. The system can store updated location information on an ongoing basis during an emergency situation, and can publish such information electronically (e.g., via a notification or a live website), so that emergency contacts that also have the corresponding application installed on their own computing devices can be able to check the user's up-to-date location at any time.

In some implementations, the system can allow a user to track sent alerts. The application executing on the user's computing device can check whether or not the user's emergency contacts have read sent emergency notifications and if not, the application can respond accordingly. For example, an emergency notification sent to an emergency contact can include a request for the emergency contact to respond with an indication that the notification has been received. The computing device can continuously or periodically check for such a response. In some implementations, such a response may be transmitted back to the computing device in the absence of any direct action on the part of the emergency contact, for example in the form of a "read receipt" indicating that information associated with the emergency notification has been displayed on an electronic device of the emergency contact.

In some implementations, the system can allow a user to receive a "dummy" call from a customized fake account configured to appear to be a contact of the user. A user can activate a special alert to receive a dummy call from the customized fake contact.

In some implementations, the system can provide customizable notifications. A user can customize the emergency notification message so only the user would understand the message displayed on the phone in an emergency. For example, when an alert is activated, the user may receive a notification from a roommate with an inconspicuous message, such as "we need milk."

In some implementations, the portable device can include a multipurpose light indicator. A double blinking light can indicate that an emergency alert was activated. A single blinking light can indicate that the battery is low.

In some implementations, the portable device can include a multipurpose vibration indicator. A first sequential vibrate can inform the user an alert was sent. A second sequential vibration can inform the user that help is on the way.

In some implementations, notification can show low battery. Notifications can display battery lifetime in a user configurable setting on the home screen of the user's computing device in days, hours, as a percentage, or in other forms.

In some implementations, the system can allow nearby good Samaritans to be notified of an emergency situation. Other users that have an instance of the application installed on their own computing devices can receive emergency notifications from the user that is not in their network if they are close by.

In some implementations, the system can include integrated pepper spray or potent. For example, the system can include a mechanism of storage and release for potent to fight off an attacker.

In some implementations, the system can include an integrated sharp object. For example, the system can include a mechanism for a sharp object to fight off an attacker.

In some implementations, the system can provide a test alert notification. A user can send test notifications to the user's contacts in order for them to prepare for real emergency situations.

In some implementations, the system can provide glucose monitoring. For example, blood sugar can be monitored by the portable device to measure severity of an emergency. In some implementations, the system can provide heartrate monitoring. For example, heart rate can be monitored by the portable device to measure severity of an emergency.

In some implementations, the system can provide a WiFi alert capability. If the user's computing device is dead, the portable device can connect to an available WiFi network to send an emergency alert.

In some implementations, the system can provide fingerprint scanning functionality, so that only the designated user can activate an alert. In some implementations, the system can include fingerprint recording functionality allowing a fingerprint to be recorded in order to use as evidence after an emergency.

In some implementations, the system can provide facial recognition. For example, video recording can be used to monitor and record an attacker. In some implementations, as described above, the system can include a computing device such as a smartphone, which may include one or more cameras. When the system is activated, the camera of the computing device can also be activated to capture video or still images. The video or still images can be processed to detect any human faces that may be included in the image data, and the human faces can be compared to a set of reference information for tracking purposes. For example, image data for faces can be compared to facial image data stored in a database of known dangerous persons, which may be provided by a governmental organization.

In some implementations, the system can track location patterns. For example, the system can track normal location patterns of the user in order to be able to detect unusual scenarios in which incidents may be occurring. For example, the user may typically leave work and go to a parking lot. If the user has left work and is mid-way to the parking lot before the user's location changes to unusual information, the location information can be used to help carry out an investigation.

In some implementations, the system can provide distance tracking reminder notifications, which can track the distance between the computing device and the portable device to remind the user if the user isn't wearing or carrying the portable device.

In some implementations, the system can provide timer tracking reminder notifications, allowing the user to customize a time of day they would like to receive a reminder to wear the portable device. For example, the user can set the time they usually leave for work to receive a reminder to wear their portable device before leaving.

In some implementations, the system can provide calendar linked monitoring. For example, the system can check the user's electronic calendar for location and event information to provide emergency contacts or police with more background information during an emergency. In some implementations, the system can provide missed events detection by comparing the user's location to calendar event information to detect if the user missed an event and notify emergency contacts to check in with the user.

The features and functionality of systems for providing emergency notifications that have been briefly introduced above are described further below in connection with FIGS. 2A-2C, 3, and 4.

Figure 2A:
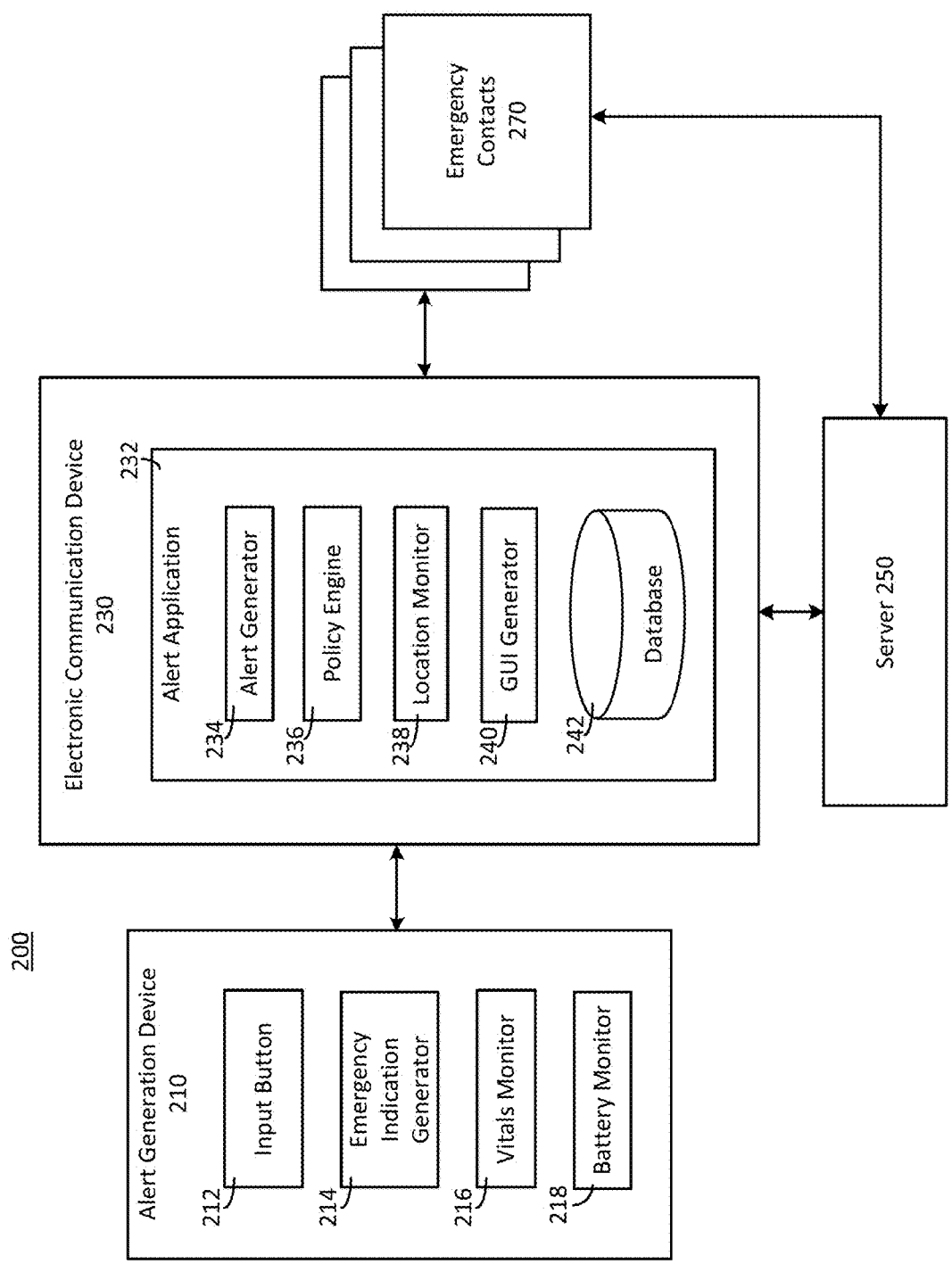
FIG. 2A depicts some of the architecture of an implementation of a system configured to provide an alert notification according to adaptive notification policies.

Referring now to FIG. 2A, an architecture of an implementation of a system 200 configured to provide an alert notification according to adaptive notification policies is depicted. The system 200 includes an alert generation device 210, an electronic communication device 230, a server 250, and a set of emergency contacts 270. The alert generation device 210 is communicatively coupled with the electronic communication device 230, and the electronic communication device 230 is communicatively coupled with the server and the emergency contacts 270. In some implementations, the components of the system 200 can include or can be implemented using the systems and devices described above in connection with FIGS. 1A-1D. For example, the alert generation device 210 may correspond to one of the agents 103a-103n shown in FIGS. 1A and 1B, the electronic communication device 230 may correspond to a respective on of the clients 102a-102n, and the server 250 may correspond to one of the servers 106a-106n. Similarly, any of the components of the system 200 may be implemented using computing devices similar to those shown in FIGS. 1C and 1D and may include any of the features of those devices, such as the CPU 121, the memory 122, the I/O devices 130a-130n, the network interface 118, etc.

Referring again to FIG. 2A, the system 200 can be used to allow a user to quickly and easily send an alert notification to one or more of the emergency contacts 270 during a situation in which the user may require immediate assistance. Generally, the user interacts with a simple user interface provided by the alert generation device 210, causing the alert generation device 210 to provide an indication to the electronic communication device 230 that the user is in distress. The electronic communication device 230 then automatically selects a subset of the emergency contacts 270 to be notified based on a set of policies, generates an alert notification, and sends the alert notification to the selected emergency contacts 270. In some implementations, certain functionality, such as enforcement of the policies, may instead be provided by the server 250 rather than the electronic communication device 230. The operation of the system 200 is described in further detail below.

The alert generation device 210 includes an input button 212, an emergency indication generator 214, a vitals monitor 216, and a batter monitor 218. The alert generation device 210 can be an electronic device that is closely held by a user such that the portable device is readily accessible by the user throughout the day. For example, the alert generation device 210 can be a wearable device, such as a device that can be integrated into clothing or a wearable accessor such as jewelry (e.g., a necklace, a bracelet, or a watch). The alert generation device 210 can also be referred to as a portable device. The alert generation device 210 may therefore be small in size and may include a simple user interface. For example, the alert generation device 210 may include only one input button 212. A user of the alert generation device 210 can use the alert generation device 210 to quickly and easily call for help in an emergency situation during which it may be impossible or inefficient for the user to interact directly with the electronic communication device 230 to call for help.

The emergency indication generator 214 can be configured to generate and transmit to the electronic communication device 230 a simple indication that the user is in distress, in response to various user inputs. For example, in some implementations, the user can press the input button 212 to cause the emergency indication generator 214 to generate and transmit the indication. In some implementations, the emergency indication generator 214 may only generate and transmit the indication in response to detecting a predetermined pattern of presses of the button 212, in order to help prevent unintentional indications from being generated. For example, the user may be required to press the input button twice within a predetermined time period in order to cause the emergency indication generator to transmit the indication to the electronic communication device 230. In some implementations, the functionality of the input button 212 can be configurable, as described further below. In some implementations, the emergency indication generator transmits the indication to the electronic communication device 230 via a wireless communication protocol, such as Bluetooth (including Bluetooth Low Energy) or WiFi. For example, the indication can be transmitted as an advertising packet. An advertising packet may include information that identifies the alert generation device 210, such as a hardware identifier, a unique device identifier (UDID), a media access control (MAC) address, an IP address, etc.

In some implementations, such an advertising packet may not include information relating to a data payload. In some implementations, the advertising packet may include at least one field explicitly identifying the packet as an advertising packet. For example, such a field may be a protocol data unit (PDU) field, which may be included in a header of the advertising packet. The PDU field may have a value selected to match a value reserved for advertising packets, or otherwise indicating that the packet is an advertising packet. In some implementations, the advertising packet may further include information indicating that the advertising packet is sent without any request to establish a connection with the electronic communication device 230. For example, the advertising packet may have a PDU Type field indicating that the alert generation device 210 is a non-connectable device. In some other implementations, the advertising packets may include a request from the alert generation device 210 to establish a connection or other communication session with the electronic communication device 230. In some implementations, the advertising packet may include an advertising payload, which may be determined based on the specific action performed on the alert generation device 210. For example, the alert generation device 210 may generate an advertising packet having an advertising payload that indicates the type of action performed by the user on the alert generation device 210, such as a single press of the input button 212, a double press, a long press, etc.

In some implementations, the emergency indication generator 214 is configured to generate and transmit the indication of distress to the electronic communication device 230 in the absence of any intentional action from a user of the alert generation device 210 (e.g., pressing the button 210). For example, the vitals monitor 216 can be configured to measure various biometric information of the user and to process such information to determine whether the emergency indication generator 214 should transmit an indication to the electronic communication device 230. In some implementations, the vitals monitor may monitor a heart rate or a blood glucose level of the user of the alert generation device 210. If the vitals monitor 216 determines that any of the vital information it receives from the user indicates a possible health emergency (e.g., a dangerously low blood glucose level or a heart rate indicative of heart failure), the vitals monitor 216 can cause the emergency indication generator 214 to send the indication to the electronic communication device 230.

The alert generation device 210 can include a battery to supply power to the various components of the alert generation device 210, and the power level of the batter can be monitored by the battery monitor 218. In some implementations, the battery may be permanently installed, and may not be rechargeable by the user. The battery may have a relatively long life, such as up to one year or longer. The battery monitor 218 can detect the battery level and can provide an alert to the user when the battery level falls below a predetermined threshold (e.g., 10%) so that the user is made aware that the alert generation device 210 (or the battery) should be replaced soon. In some implementations, the battery monitor 218 can provide the alert via an output device associated with the alert generation device 210, such as an indicator light or a speaker.

In some implementations, to conserve battery, the alert generation device 210 can be configured to respond to the user interaction by transitioning from a first state to a second state. For example, the alert generation device 210 may normally be in a low power mode, such as a sleep mode, in which the alert generation device 210 conserves power by not transmitting information, or by only transmitting information infrequently. The alert generation device 210 can be configured to transition out of the lower power mode or sleep mode and into a different state in which the alert generation device 210 begins transmitting the advertising packet one or more times in response to the user interaction (e.g., a press or pattern of presses of the input button 212). In some implementations, the alert generation device 210 can pair with the electronic communication device 230 once, and may then enter the low power mode or sleep mode until the user performs the action that causes the alert generation device 210 to transition out of the sleep mode and begin transmitting the advertising packet. For example, the initial pairing can include any process by which the alert generation device 210 registers with or identifies itself to the electronic communication device 230. The electronic communication device 230 can store a universal device identifier (UDID) or other identifier associated with the alert generation device 210 after the initial pairing, and therefore may recognize the advertising packet as originating from the alert generation device 210 based on a match between the stored identifier and an identifier included in the advertising packet.

The electronic communication device 230 can be any type of computing device owned, operated, or otherwise associated with the user of the alert generation device 210. For example, the computing device can be a mobile phone, a tablet computing device, a laptop computing device, or a desktop computing device. In some implementations, the electronic communication device 230 can be referred to simply as a computing device. Such devices are often useful for sending communications to various contacts of the user. However, communicating via the electronic communication device 230 can be time consuming and can require physical access to the electronic communication device 230 by the user, which may be difficult or impossible during an emergency situation. To allow the computing device to automatically notify the emergency contacts 270 that the user may be in danger, the electronic communication device 230 executes an alert application 232.

The alert application 232 can be any type or form of software capable of executing on the electronic communication device 230, and may be configured to execute at all times while the electronic communication device 230 is powered on. The alert application 232 is configured to establish one or more event listeners on the electronic communication device 230. The event listeners can be configured to listen for communications or signals received by the computing device that are generated by the portable device. The portable device may, responsive to a user pressing the button on the portable device, transmit a signal to the electronic communication device 230 via a short-range communications protocol, such as BLE. The one or more event listeners established by the application may identify that the electronic communication device 230 receives the signal from the portable device. The event listener that identifies that the electronic communication device 230 receives the signal causes the electronic communication device 230 to launch the application 232.

The alert application 232 includes an alert generator 234, a policy engine 236, a location monitor 238, a graphical user interface (GUI) generator 240, and a database 242. The alert application 232 can be configured to receive the emergency indication sent by the alert generation device 210. Upon receiving the emergency indication, the alert application 232 attempts to identify a subset of the contacts 270 who should be notified that the user may be experiencing an emergency requiring immediate assistance. For example, the policy engine 236 can be configured to determine the subset of emergency contacts 270 to notify based on one or more policies.

Policies may be stored in the database 242 and may include a set of rules relating to the emergency contacts 270 who should be notified that the user is experiencing an emergency under different circumstances, as well as the alert types that should be sent to the emergency contacts. In some implementations, contact information for the emergency contacts 270 also can be stored in the database 242. In an example, upon receiving the emergency indication from the alert generation device 210, the application 232 can use the location monitor 238 to determine the current location of the electronic communication device 230. Generally, it can be assumed that the location of the electronic communication device 230 is the same as the location of the user. The location monitor 238 can be configured to determine the location based on information received from a global positioning system receiver of the electronic communication device 230, a known location of a wireless network to which the electronic communication device 230 is connected, cellular tower triangulation, or by other suitable means.

In some implementations, the location monitor 238 can also use information from other sensors of the electronic communication device to determine the location of the electronic communication device 230 or to supplement location information determined in other ways. For example, a GPS measurement may be sufficient identify a street address corresponding to the current location of the electronic communication device. However, some addresses may be associated with large buildings, and therefore may not provide complete information that would allow an emergency contact to locate a person within the street address. The location monitor 238 may also be configured to use information received from an accelerometer, a barometer, a compass, a pedometer, or other sensors included in the electronic communication device 230 to further specify the current location. For example, accelerometer or barometer information can be used to determine an height or altitude of the electronic communication device 230. By dividing the height or altitude by an average floor height (e.g., 10 feet), the location monitor 238 can be configured to determine which floor of a building the electronic communication device 230 is on at the address determined from the GPS measurement. Similarly, such sensor information can be used to determine how far into the building or particular floor the user is, for example based on a number of steps taken by the user at that address.

In some implementations, the location monitor 238 can be configured to predict a likely location of a user at a particular time based on the user's past behavior. For example, the location monitor 238 can determine that the user typically has a routine of visiting a particular location (e.g., a gym) on Monday mornings, and then going to work after the gym. The location monitor 238 can use this information to store a record of the user's typical behavior with respect to location. In some implementations, the electronic communication device 230 can use this type of expected or likely location information based on past user behavior to determine that the user is expected to be at a particular location. Then, if the user fails to be an expected location (e.g., the user deviates from the traditional location-based routine identified by the location monitor 238, or the user misses one or more calendar appointments), the alert generator 234 can be configured to send an alert to one or more emergency contacts to prompt the emergency contacts to check in with the user.

In some implementations, the location monitor 238 can also be configured to transmit location information for the electronic communication device 230 to the server 250 for remote storage. For example, the location monitor 238 can send such information to the server 250 on a periodic basis (e.g., every hour, every 15 minutes, etc.). Doing so can help to ensure that location information for the user is available even if the electronic communication device 230 is powered off, for example due to a battery failure. In some implementations, the location monitor 238 may only send the location information to the server 250 when a battery level of the electronic communication device 230 falls below a threshold, such as 10% or 5% of its maximum capacity.

The policy engine 236 can then use the location information to select a subset of the emergency contacts 270 to notify that the user may be experiencing an emergency based on one or more policies stored by (or otherwise accessible to) the policy engine 236. The policies may be configurable by the user, and may account for any combination of various factors including location, time, and calendar information (e.g., expected destinations or calendared events). For example, if the policy engine 236 determines that the location information indicates the electronic communication device 230 is at or near the user's place of employment, then the policy engine 236 can select a subset of the emergency contacts that include the user's coworkers, who are likely to be in close proximity to the user. In another example, if the policy engine 236 determines that the location information indicates the electronic communication device 230 is at or near the user's home, then the policy engine 236 can select a subset of the emergency contacts that include the user's friends or family members who live near the user. In some implementations, the policy engine 236 may select one or more emergency contacts based on a current time. For example, the policy engine may select one or more of the user's coworkers as emergency contacts for an emergency situation that occurs during the user's normal business hours (e.g., between 9:00 AM and 5:30 PM), and may select one or more of the user's family members or friends as emergency contacts for an emergency situation that occurs outside of the user's normal business hours (e.g., after 5:30 PM). In some implementations, the policy engine 236 may select other types of emergency contacts, such as police, firefighters, or other emergency workers.

The policy engine 236 also can be configured to use other policy information to select the subset of emergency contacts 270 to notify. For example, the policy engine 236 can be configured to access information obtained from an electronic calendar maintained by the user. If an emergency indication is received from the alert generation device 210, the policy engine can use the calendar information and location information obtained from the location monitor 238 to determine whether the user appears to have missed a scheduled appointment. The policy engine may select at least some of the emergency contacts 270 based on the calendar and/or location information. For example, if the emergency indication arrives from the portable device at a time during which the user is scheduled to be at a work-related event, the policy engine can select one or more of the user's coworkers to be notified.

When the policy engine 236 determines the subset of emergency contacts 270 to be notified, the alert generator 234 can generate and transmit one or more alerts to the selected subset of emergency contacts 270. In some implementations, the alert generator 234 is configured to generate the alert to include relevant information such as the user's location, so that the notified emergency contacts will be better able to reach the user to provide assistance. The alert generator 234 can be configured to generate alerts in various forms, including email, text messages, voice calls, or application-based notifications. The alert application 232 then sends generated alerts to the selected emergency contacts 270.

In some implementations, the policy engine 236 can be configured to select emergency contacts 270 in a sequential fashion over time. For example, in some implementations the policy engine can select a first emergency contact 270 to receive an alert. After the alert generator 234 has sent the alert to the first emergency contact 270, the policy engine 236 can be configured to confirm whether the first emergency contact 270 responds to the alert. In some implementations, the response from the first emergency contact 270 can be communicated in a manner similar to that of the alert sent to the first emergency contact 270. For example, if the alert is sent to the first emergency contact 270 as a text message, the first emergency contact 270 can respond by sending a reply text message. In some implementations, the policy engine 236 can wait for a predetermined amount of time to receive confirmation that the first emergency contact 270 has responded to the alert. If the policy engine 236 determines that no response is received from the first emergency contact 270, then the policy engine 236 can select a second emergency contact who should be alerted, and the alert generator 234 can transmit an alert to the second emergency contact. In some implementations, the policy engine 236 can be configured to repeat this process for a third emergency contact 270, a fourth emergency contact 270, etc., until a response is received from at least one emergency contact 270 who has received an alert. By selecting emergency contacts 270 in this fashion, the policy engine 236 can reduce the total number of alerts sent by the alert generator relative to implementations in which alerts are sent to a large number of emergency contacts 270 simultaneously, while still ensuring that at least one emergency contact responds to the alert.

Similarly, in some implementations, the policy engine 236 can be configured to select various formats for the alert to be sent based on whether or not a response has been received. For example, the policy engine 236 can determine that an alert in the form of a text message should be sent to a subset of the emergency contacts 270. If the policy engine 236 does not detect a response from any emergency contact 270 included in the selected subset of emergency contacts 270 within a predetermined time period, the policy engine 236 can be configured to cause the alert generator 234 to send a different type of alert, such as a phone call, to the same subset of emergency contacts 270. The policy engine 236 can repeat this process with additional alert types until at least one response is received from one of the selected subset of emergency contacts 270. Thus, the policy engine 236 can reduce the total number of alerts sent, relative to implementations in which alerts of multiple types are sent simultaneously.

In some implementations, the alert application 232 can invoke an emergency service such as RapidSOS. RapidSOS is a service that can connect an individual to nearby 911 operators, and can provide additional information such as location information to the nearby 911 operators. Because the alert application 232 may often be used in situations in which the user is unable to place an emergency call or otherwise interact with the electronic communication device 230, the alert application 232 can be configured to use the RapidSOS service to connect one of the emergency contacts 270 to a 911 operator near the user's location. For example, in some implementations, the alert application 232 can connect a voice call between a selected emergency contact 270 and a 911 operator near the user's location. The selected emergency contact 270 can then speak to the 911 operator to let them know that the user needs emergency assistance. In some implementations, the alert application 232 also can be configured to transmit information corresponding to the user's current location to the 911 operator, so that the 911 operator can more effectively dispatch emergency workers to assist the user if necessary.

In some implementations, one or both of the electronic communication device 230 and the alert generation device 210 can be configured to provide an indication to the user that an emergency contact 270 has received their request for help and/or that help is on the way. In some implementations, this indication may be provided using an output device of either the electronic communication device 230 or the alert generation device 210, such as an audible alert played through a speaker or a vibration pattern output by a vibrational output device. For example, as described above, the alert application 232 can be configured to detect whether an emergency contact 270 has responded to an alert. When such a response is detected, the alert application 232 can be configured to cause the electronic communication device 230 to provide an indication (e.g., an audible or vibrational output) that the response was received. In some implementations, the alert application 232 also can transmit information corresponding to the response back to the alert generation device 210, for example via Bluetooth or another form of wireless communication. The alert generation device 210 can also be configured to provide an indication, such as an audible or vibrational output, that the response was received so that the user can be assured that at least one emergency contact 270 has successfully been notified that the user needs assistance.

In some implementations, as described above, the input button 212 of the alert generation device 210 can be configurable, and its functionality can be integrated with the policy engine 236. In some implementations the database 242 may store a policy indicating an alert type to be sent in response to a predetermined pattern of presses of the input button 212. For example, if the user double presses the input button 212, the policy may indicate that text messages should be sent to one or more emergency contacts 270 to notify them that the user is experiencing an emergency. The policy may also indicate that if the user triple presses the input button 212, then voice calls should be sent to the one or more emergency contacts 270 to notify them that the user is experiencing an emergency. The emergency indication generator 214 can be configured to transmit the indication to the electronic communication device 230 including information corresponding to the pattern of button presses entered by the user, and the policy engine 236 can be configured to select a format for the notification type to be sent based on the pattern of button presses entered by the user, according to a policy stored in the database 242.

The GUI generator 240 is configured to provide an interface allowing the user to interact with the alert application 232. In some implementations, the interface can allow the user to configure settings and preferences of the alert application 232 upon initial setup of the alert application 232, prior to experiencing any emergency. For example, the GUI generator 240 can be configured to provide an interface allowing the user to enter contact information for each of the emergency contacts 270, as well as other information related to the emergency contacts 270, such as a relationship between the user and each emergency contact 270 that may be relevant to one or more policies used by the policy engine 236 to determine which emergency contacts 270 should be notified during a particular emergency situation. In some implementations, the GUI generator 240 can provide an interface that assists a user with recording an audio message on the electronic communication device 230, which may be used as the alert notification to be sent to the emergency contacts 270 in the event of an emergency.

In some implementations, the GUI generator 240 can be configured to provide an interface to allow the user to connect one or more social network accounts to the alert application 232. For example, the user can enter login credentials, such as a username, email address, password, etc., for one or more social media accounts via the interface provided by the GUI generator 240. For each social media account that the user chooses to connect, the user may enable a feature allowing for emergency alerts to be provided through the connected social media account when the user requires emergency assistance. For example, when the user presses the input button 212 on the alert generation device 210 (or otherwise performs an action or experiences a situation causing the alert generation device 210 to transmit an indication of an emergency to the electronic communication device 230), the alert generator 234 can be configured to generate a corresponding alert by adding a post or updating a status of the user on the connected social media platform to indicate that the user may require emergency assistance. In some implementations, the post or status update can also include additional information, such as the location information identified by the location monitor 238. Thus, friends, family members, and others who follow the user through the connected social media platform can be notified that the user may require emergency assistance.

In some implementations, the interface provided by the GUI generator 240 can also be configured to allow the user to select a feature to notify "good Samaritans" who may be nearby through any of the connected social media accounts. For example, when the user is experiencing an emergency, the alert generator 234 can be configured to determine one or more social media users who have checked into a location near the user's current location (e.g., as determined based on information from the location monitor 238) via a social media account. The alert generator 234 can then send a message or other notification to the one or more nearby users via the connected social media account to let them know that the user may require assistance. In some implementations, the message or notification can include information including the user's identity, photo, current location, and profile information.

In some implementations, after the alert application 232 has received an indication from the emergency indication generator 214 of the alert generation device 210, the GUI generator 240 can be configured to provide a GUI allowing the user to indicate that the emergency situation has ended and that the user is no longer in need of immediate assistance. After the user has indicated that the emergency situation has ended, the alert application 232 can be configured to send an updated alert to notify those emergency contacts 270 who have received an alert indicating that the user was experiencing an emergency, so that those emergency contacts 270 will know that the user is safe and no longer requires their help. In some implementations, the updated alert can be sent in the same format as the original alert indicating the emergency situation, such as a text message, and email, or a voice call. In some implementations, the alert application 232 can be configured not to transmit an updated alert to any emergency contacts 270 to whom the original alert was not sent, as those emergency contacts 270 do not have a need to receive the updated alert.

In some implementations, some of the functionality described above, such as enforcement of the policies, selection of emergency contacts 270 to be notified in the event of an emergency, and transmission of the alert to the selected emergency contacts 270, can be selected by the server 250. The server 250 also manage other aspects of the system 200. For example, in some implementations, there may be a large number of third parties who each have a computing device similar to the electronic communication device 230 that executes a respective instance of the alert application 232. When the alert application 232 of the user's electronic communication device 230 receives an indication from the alert generation device 210 that the user is experiencing an emergency, the server 250 can be configured to identify the third parties who are near the user's location, and may transmit a communication to the third parties indicating that the user needs assistance. Thus, the system 200 can allow third parties unrelated to the user to act as "good Samaritans" when the user is in distress. This can be particularly helpful in instances in which none of the user's emergency contacts are physically located near the user at the time of the emergency. In addition, instances of the alert application 232 can be configured to transmit alerts for other users whose devices (similar to the electronic communication device 230) may be powered off. For example, if the user presses the input button 212 of the alert generation device 210 to request emergency assistance, but the user's electronic communication device 230 is powered off, other devices belonging to other nearby users that are executing an instance of the alert application 232 can be configured to transmit an alert on behalf of the user whose device is powered off. Thus a group of devices such as the electronic communication device 230, as well as the server 250, can serve as a mesh network or tile-based solution for providing emergency alerts.

Figure 2B:
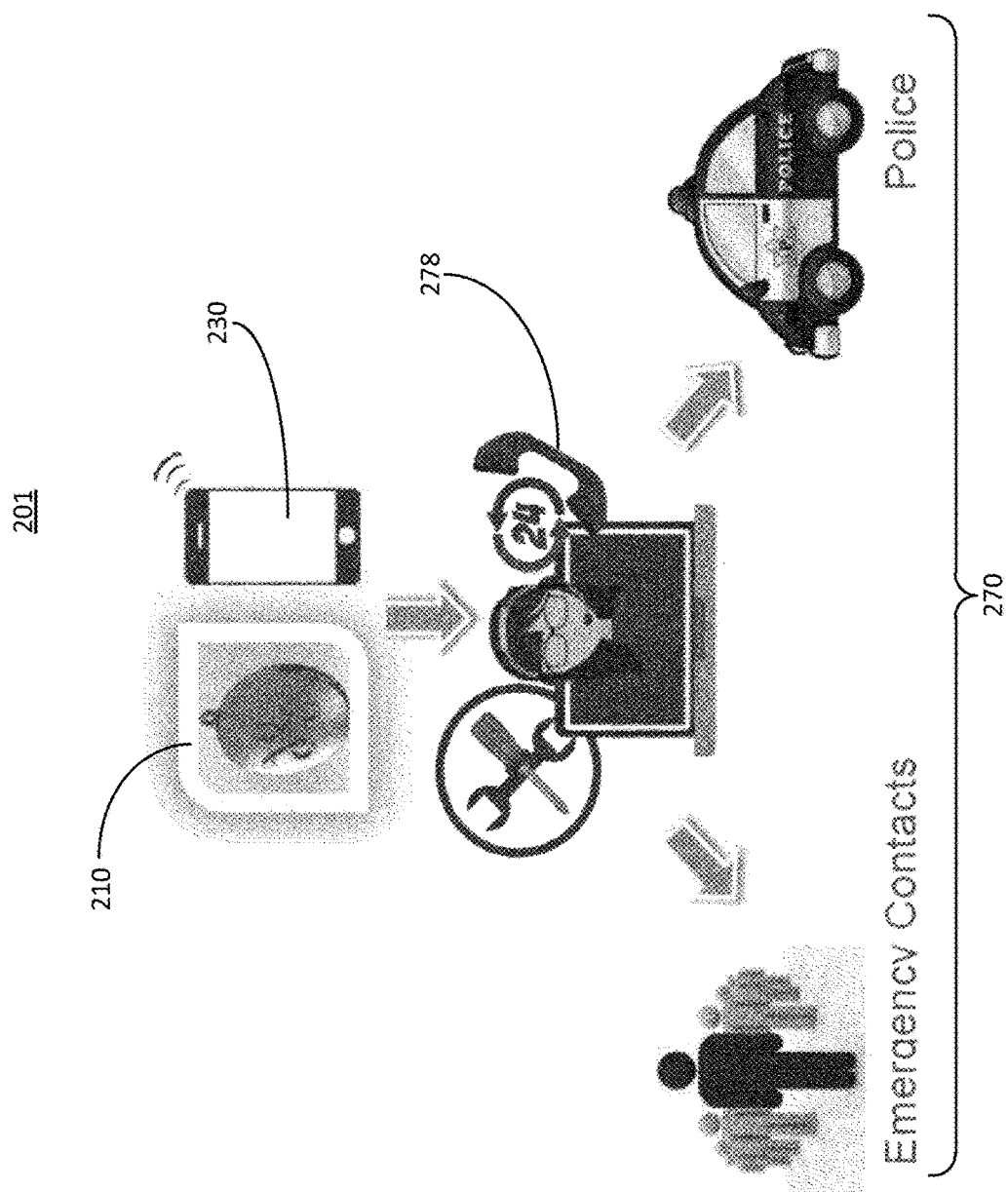
FIG. 2B depicts an alternative configuration of the system shown in FIG. 2A.

FIG. 2B depicts an alternative configuration 201 of the system 200 shown in FIG. 2A. As shown, the system 201 includes the alert generation device 210, the electronic communication device 230, and the emergency contacts 270, all of which perform functions similar to those described above in connection with FIG. 2A. The system 201 also includes a security system 278 that serves as an intermediary between the electronic communication device 230 and the emergency contacts 270. For example, the security system 278 can be or can include a remote help center that can be staffed by human employees who may receive from the electronic communication device 230 or the alert generation device 210 the indication that the user is experiencing an emergency. The employees can then reach out to the selected emergency contacts 270, which may include police or other emergency workers. The employees may be able to provide a greater level of assurance that the selected emergency contacts have been notified, and may be able to provide follow-up communications to those emergency contacts 270 who may not respond to an initial alert.

In some other implementations, the security system 278 can be a home security system within the user's home. For example, such a home security system may include at least one computing device, which may execute at least one application configured to contact the emergency contacts 270 and/or to sound an alarm when activated. In such implementations, the alert application 232 executing on the electronic communication device 230 can interact with the security system 278 via one or more application programming interface (API) calls to the security system 278 that activate the security system 278. For example, the alert generator 234 can be configured to make the one or more API calls to the security system 278 in response to receiving the indication that the user requires emergency assistance from the emergency indication generator 214. In some other implementations, the alert generation device 210 itself may activate the security system 278 (e.g., via one or more API calls), when the user enters a predetermined pattern of presses via the input button 212. The alert generation device 210 and the electronic communication device 230 can be configured to communicate with the security system 278 via any type of wired or wireless communications protocol, including Bluetooth or Wifi. In some implementations, the security system 278 may be accessible via a phone connection, and the alert generation device 210 and the electronic communication device 230 can be configured to communicate with the security system 278 by dialing a phone number associated with the security system 278 to activate the security system 278.

Figure 2C:
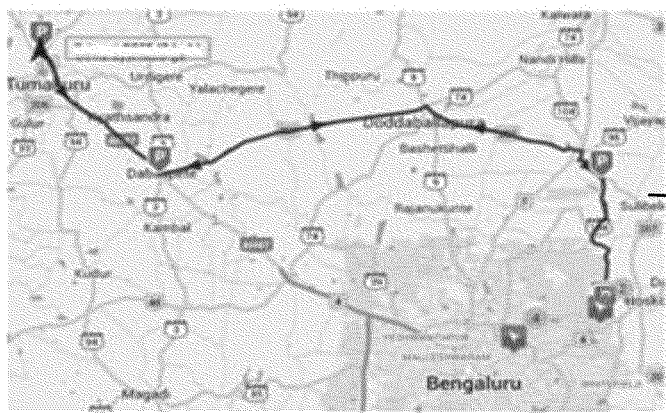
FIG. 2C depicts a website that can serve as an alert notification within the system of FIG. 2A.
Figure 2C:
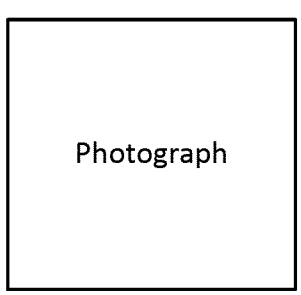

FIG. 2C depicts a website 275 that can serve as an alert notification within the system 200 of FIG. 2A. For example, as described above, the alert generator 234 can be configured to provide alerts that may include messages or other notifications having a live link to a URL of a website such as the website 275 to enable recipients to identify and locate the user who requires emergency assistance. For example, the website 275 can include location information 280, as well as a corresponding map 282, which may correspond to information determined by the location monitor 238. The website 275 can also include identification information 284, which can include information such as a name of the user, a photograph of the user, a phone number for the user, the user's date of birth, the user's height and weight, and the user's ethnicity. The website 275 can also include other attributes information 286, which may include any allergies or medical conditions experienced by the user, disabilities of the user, medications prescribed to the user, or any other additional notes. In some implementations, the information displayed on the website 275 can be provided by the user, for example via an interface generated by the GUI generator 240 during an initial setup of the alert application 232. In some implementations, some of the information, such as the location information 280 and corresponding map 282, can be updated in real-time or near real-time while (e.g., based on updated information from the location monitor 238), so that a recipient of the notification that includes a link to the website 275 can have access to accurate location information over time. In some implementations, at least some of the information shown in the website 275 may be provided to the recipient of an alert notification (e.g., a user's emergency contact) in other ways. For example, the user's emergency contact may have a computing device that executes an application that may be a companion application to the alert application 232. In some implementations, such a companion application can include another instance of the alert application 232. The companion application can display any or all of the information shown in connection with the website 275 when the user experiences an emergency situation. In some implementations, the companion application may also include directions to the user's location. For example, the directions can include directions to an address or general area in which the user is located, as well as step by step instructions for finding the user within a building at a particular address.

Figure 3:
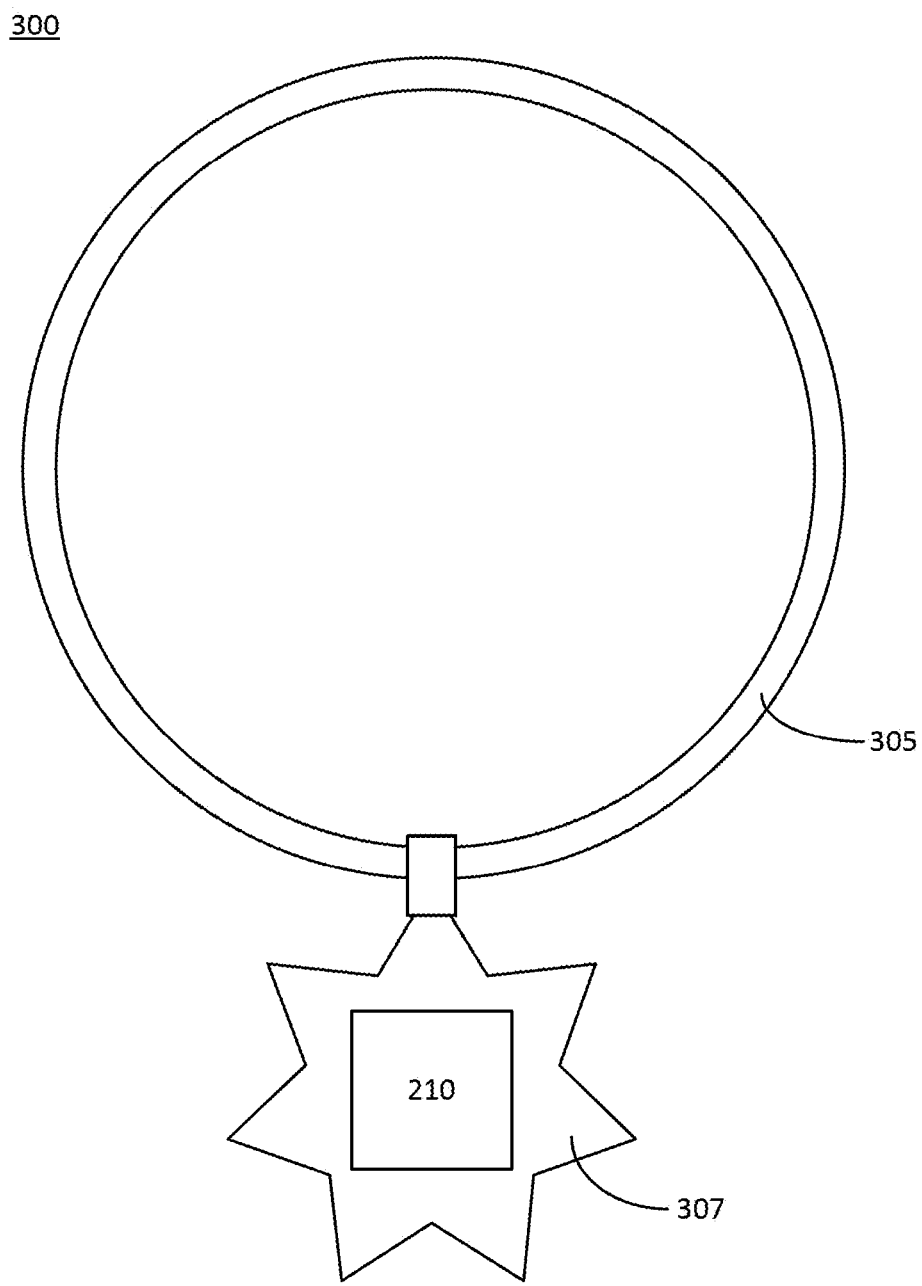
FIG. 3 depicts a fashion accessory that can be used in connection with the system shown in FIG. 2A.

FIG. 3 depicts a fashion accessory 300 that can be used in connection with the system shown in FIG. 2A. In this example, the fashion accessory includes a bracelet 305 having a charm 307. The charm 307 can be configured to interface with the alert generation device 210, such that the alert generation device 210 is integrated within the charm 307. In some implementations, the alert generation device 210 can be removably attached to the charm 307, such that the user can attach and remove the alert generation device 210 from the charm 307. It should be understood that the form of the accessory 300 is illustrative only. In some implementations, many other forms of accessories, including necklaces, watches, and bracelets, may also be available. Such other accessories may also include a component that is configured to interface with the alert generation device 210 in a manner similar to that of the charm 307 shown in FIG. 3. Thus, the user may remove the alert generation device 210 from the charm 307 and may attach the alert generation device 210 to another one of the accessories according to the preferences of the user. In general, the form of the accessor 300 does not impact the operation of the alert generation device 210. Therefore, the accessory can be chosen primarily for aesthetic reasons and may be designed to be stylish and discreet when worn. As a result, the user is able to interact with the alert generation device 210 as described above in connection with FIG. 2A, regardless of the particular accessor to which the device 210 may be affixed at a given time.

Figure 4:
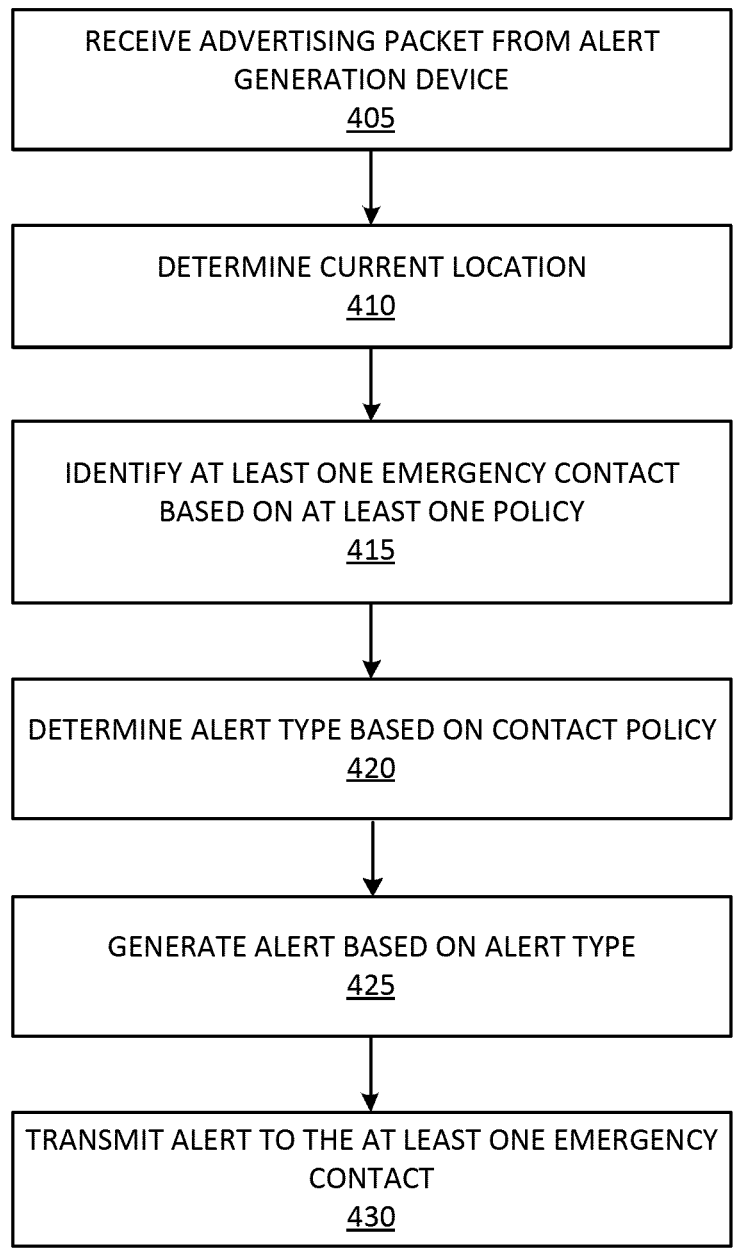
FIG. 4 depicts an implementation of a method for providing an alert notification according to adaptive notification policies.

FIG. 4 depicts an implementation of a method 400 for providing an alert notification according to adaptive notification policies. Generally, the method can be performed by a computing device such as the electronic communication device 230 shown in FIG. 2A. In brief overview the method 400 includes receiving an advertising packet from an alert generation device (step 405), determining a current location (step 410), identifying at least one emergency contact based on at least one policy (step 415), determining an alert type based on the contact policy (step 420), generating an alert including a request for assistance (step 425), and transmitting the alert to the at least one emergency contact (step 430).

Referring again to FIG. 4, and in greater detail, the method 400 includes receiving an advertising packet from an alert generation device (step 405). In some implementations, the alert generation device can be the alert generation device 210 shown in FIG. 2A. In some implementations, the advertising packet can be a low energy advertising packet, such as a Bluetooth Low Energy (BLE) advertising packet. The advertising packet can be a packet intended to advertise a presence of the alert generation device in the vicinity of the electronic communication device. Thus, the advertising packet may be distinguished from other types of packets, such as data packets, that are intended to convey a data payload after a communication channel has been established between the alert generation device and the electronic communication device. For example, the advertising packet may have a smaller data payload than a typical data packet, or may not include a data payload at all. In some implementations, the advertising packet may include only information such as a preamble and a device identifier (such as a UDID) of the alert generation device.

In some implementations, the advertising packet can be sent by the alert generation device in response to a user action performed on the alert generation device. For example, a user may perform an action using the input button 212 of the alert generation device 210, as shown in FIG. 2A. The action can include a single press of the input button 212, a double press of the input button 212, a long press of the input button 212 (i.e., holding the input button 212 in a depressed position for a period of time before releasing the input button 212), or any other pattern of presses of the input button 212. In some other implementations, the alert generation device 210 can transmit the advertising packet in the absence of direct user action, such as based on a reading from the vitals monitor 216. As described above, a user may use the alert generation device 210 to inform contacts that the user requires emergency assistance. When the user requires such assistance, the user can perform the action on the alert generation device 210 that causes the alert generation device 210 to transmit the advertising packet to be received by the electronic communication device. Thus, the advertising packet itself can serve as an indication of an emergency situation. In some implementations, the electronic communication device can execute an application that determines that the user may require emergency assistance based on receiving the advertising packet, similar to the alert application 232 shown in FIG. 2A. Thus, the user can cause the alert generation device to indicate that the user of the alert generation device is in distress by interacting with the alert generation device, thereby causing the alert generation device to transmit the advertising packet to the electronic communication device.

In some implementations, the user interaction that causes the alert generation device to transmit the advertising packet can also cause the alert generation device to transition from a first state to a second state. For example, as described above, the alert generation device may normally be in a low power mode, such as a sleep mode, in which the alert generation device conserves power by not transmitting information or by only transmitting information infrequently. The user interaction (e.g., a press or pattern of presses of the input button 212) can cause the alert generation device to transition out of the low power mode or sleep mode and to begin transmitting the advertising packet one or more times. In some implementations, the alert generation module can pair with the electronic communication device once, and may then enter the low power mode or sleep mode until the user performs the action that causes the alert generation device to transition out of the sleep mode and begin transmitting the advertising packet. For example, the initial pairing can include any process by which the alert generation device registers with or identifies itself to the electronic communication device. The electronic communication device can store a UDID or other identifier associated with the alert generation device after the initial pairing, and therefore may recognize the advertising packet as originating from the alert generation device based on a match between the stored identifier and an identifier included in the advertising packet.

The method includes determining a current location (step 410). The current location can correspond to the location of the electronic communication device that performs the method 400. In some implementations, the location can be determined by a location monitor such as the location monitor 238 shown in FIG. 2A. The location monitor can determine the location based on information received from a global positioning system receiver of the computing device, a known location of a wireless network to which the computing device is connected, or by cellular tower triangulation. In some implementations, the location monitor can also use information from other sensors of the electronic communication device to supplement location information determined in other ways. For example, a GPS measurement can provide a street address of the electronic communication device. The electronic communication device may also be configured to use information received from an accelerometer, a barometer, or other sensors to further specify the current location, such as by determining a floor of a building that the electronic communication device is on at the address determined from the GPS measurement.

The method 400 can include determining at least one emergency contact based on at least one policy (step 415). In some implementations, this can be performed by a policy engine such as the policy engine 236 shown in FIG. 2A. For example, if the policy engine determines that the location information indicates the computing device is at or near the user's place of employment, then the policy engine can select a subset of the emergency contacts that include the user's coworkers. If the policy engine determines that the location information indicates the computing device is at or near the user's home, then the policy engine can select a subset of the emergency contacts that include the user's friends or family members who live near the user. In some implementations, the policy engine may select other types of emergency contacts, such as police, firefighters, or other emergency workers.

The policy engine also can be configured to use other policy information to select the subset of emergency contacts to notify. For example, the policy engine can be configured to access information obtained from an electronic calendar maintained by the user. If an emergency indication is received from the portable device, the policy engine can use the calendar information and location information obtained from the location monitor in step 410 to determine whether the user appears to have missed a scheduled appointment. The policy engine may select at least some of the emergency contacts based on the calendar and/or location information.

The method 400 includes determining an alert type based on the contact policy (step 420). In some implementations, this step can be performed by the policy engine of the electronic communication device. In some implementations, the alert type can be based on a preference of the identified emergency contact. For example, a user may store a list of contacts along with contact preferences for the contacts on the electronic communication device. The alert type may include an email, a text message, a voice call, or an application-specific alert (e.g., a notification associated with a particular application executing on a computing device of the identified emergency contact). In some implementations, the policy engine can be configured to identify more than one alert type for a given emergency contact. For example, alerts of two or more types can be sent to the identified emergency contact, either simultaneously or at predetermined intervals. In some implementations, the alert type can include a social media-based alert. For example, the policy engine can be configured to select an alert type corresponding to a status update of one or more social media accounts of the user to indicate that the user may require emergency assistance. The alert type can also include a link to a uniform resource locator (URL) or a website that may include information indicating that the user requires emergency assistance. For example, the website can include information identifying the user, as well as current location information of the user. In some implementations, the website can be updated in real time to include accurate location information on an ongoing basis. The alert type may therefore include a link to the website to be sent to the emergency contact via a text-based form of communication, such as via email or SMS message.

The method 400 includes generating the alert (step 425). In some implementations, this can be performed by an alert generator such as the alert generator 234 shown in FIG. 2A. The alert generator can generate alerts in various forms. For example, the alert generator can generate an alert as an email, a text message, or a voice call, depending on the alert type determined in step 420. The alert can include the user's identity as well as the user's location, so that emergency contacts who receive the alert will be able to go to the user's location to provide assistance. The alert generator can also be configured to update a social media status of the user or to create and/or update a website including the user's identity, location, and request for assistance, as described above. The method 400 also includes transmitting the alert to the at least one emergency contact (step 430). For example, the electronic communication device can transmit the alert according to the alert type, such as by sending the email or text message, initiating the voice call, sending the link to the website, etc. In some implementations, the electronic communication device can send the alert via any form of wired or wireless communication network, such as the Internet or a cellular-based network.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A system for providing an alert notification, comprising an alert generation device comprising a triggering element and an electronic communication device, the electronic communication device configured to:

receive, from the alert generation device, a low power advertising packet via a short-range wireless communication protocol responsive to an action performed on the triggering element of the alert generation device causing the alert generation device to switch from a first state to a second state, wherein the alert generation device is configured to consume more power in the second state than in the first state, the low power advertising packet including at least one field including a value reserved for advertising packets; and responsive to the electronic communication device receiving the low power advertising packet from the alert generation device, the electronic communication device further configured to:

determine a current location of the electronic communication device using a sensor of the electronic communication device;

identify at least one contact to receive an alert based on a contact policy, wherein the contact policy is stored in a memory element of the electronic communication device; and transmit a communication event to a remote communication device of the at least one contact, the communication event configured to cause generation of the alert on the remote communication device of the at least one contact;

determine that the at least one contact has not provided a response to the alert within a predetermined time period;

identify, responsive to the determination that the at least one contact has not provided the response to the alert within the predetermined time period, a second contact to receive a second alert based on the contact policy; and transmit a second communication event to a second remote communication device associated with the second contact, the second communication event configured to cause generation of the second alert on the second remote communication device of the second contact.

2. The system of claim 1, wherein the contact policy comprises calendar information stored in a memory element of the electronic communication device.

3. The system of claim 2, wherein the electronic communication device is configured to identify the at least one contact by:

determining, based on the calendar information stored in the memory element of the electronic communication device, that a user of the electronic communication device is scheduled to be at a work-related event when the low power advertising packet is received; and identifying the at least one contact from among a plurality of coworkers of the user.

4. The system of claim 1, wherein the electronic communication device identifies the at least one contact by:

determining a respective current location of each of a plurality of contacts; and identifying the at least one contact from among the plurality of contacts based on a proximity of the current location of each of the plurality of contacts to the current location of the electronic communication device.

5. The system of claim 1, wherein the electronic communication device further receives a first response to the second alert from the second remote communication device of the second contact, the response indicating that the second contact received the second alert.

6. The system of claim 1, wherein the electronic communication device is further configured to generate, responsive to receiving the low power advertising packet, an audible alarm.

7. The system of claim 1, wherein the electronic communication device is further configured to generate a visual indication that the communication event was transmitted to the at least one contact.

8. The system of claim 1, wherein the electronic communication device transmits the communication event to the at least one contact by updating a status of a social media account of a user of the electronic communication device to indicate that the user of the electronic communication device may require assistance.

9. The system of claim 1, wherein the alert includes an indication of the current location of the electronic communication device.

10. The system of claim 1, wherein the electronic communication device is further configured to:

track, for a predetermined period of time, the current location of the electronic communication device; and update, during the predetermined period of time, a website to include an indication of the current location of the electronic communication device during the predetermined time period, wherein the alert comprises a uniform resource locator (URL) of the web site.

11. A method for providing an alert notification, comprising:

receiving, by an electronic communication device from an alert generation device via a short-range wireless communication protocol, a low power advertising packet responsive to an action performed on a triggering element of the alert generation device causing the alert generation device to switch from a first state to a second state, wherein the alert generation device is configured to consume more power in the second state than in the first state, the low power advertising packet including at least one field including a value reserved for advertising packets; and responsive to the electronic communication device receiving the low power advertising packet from the alert generation device:

determining, by the electronic communication device, a current location of the electronic communication device using a sensor of the electronic communication device;

identifying, by the electronic communication device, at least one contact to receive an alert based on a contact policy, wherein the contact policy is stored in a memory element of the electronic communication device;

transmitting, by the electronic communication device, a communication event to a remote communication device of the at least one contact, the communication event configured to cause generation of the alert on the remote communication device of the at least one contact determining, by the electronic communication device, that the at least one contact has not provided a response to the alert within a predetermined time period;

identifying, by the electronic communication device responsive to the determination that the at least one contact has not provided the response to the alert within the predetermined time period, a second contact to receive a second alert based on the contact policy;

transmitting, by the electronic communication device, a second communication event to a second remote communication device associated with the second contact, the second communication event configured to cause generation of the second alert on the second remote communication device of the second contact.

12. The method of claim 11, wherein the contact policy comprises calendar information stored in a memory element of the electronic communication device.

13. The method of claim 12, wherein identifying the at least one contact comprises:

determining, by the electronic communication device based on the calendar information stored in the memory element of the electronic communication device, that a user of the electronic communication device is scheduled to be at a work-related event when the low power advertising packet is received; and identifying the at least one contact from among a plurality of coworkers of the user.

14. The method of claim 11, wherein identifying the at least one contact comprises:

determining, by the electronic communication device, a respective current location of each of a plurality of contacts; and identifying the at least one contact from among the plurality of contacts based on a proximity of the current location of each of the plurality of contacts to the current location of the electronic communication device.

15. The method of claim 11, further comprising receiving, by the electronic communication device, a first response to the second alert from the second remote communication device of the second contact, the response indicating that the second contact received the second alert.

16. The method of claim 11, further comprising generating, by the electronic communication device responsive to receiving the low power advertising packet, an audible alarm.

17. The method of claim 11, further comprising generating, by the electronic communication device, a visual indication that the communication event was transmitted to the remote communication device of the at least one contact.

18. The method of claim 11, wherein transmitting the communication event to the remote communication device of the at least one contact comprises updating a status of a social media account of a user of the electronic communication device to indicate that the user of the electronic communication device may require assistance.

* * * * *